H. PHILLIPS
Nov. 8, 1932. LEVELING CUSHION FOR RADIOCABINETS Re. 18,647
Original Filed July 22, 1929
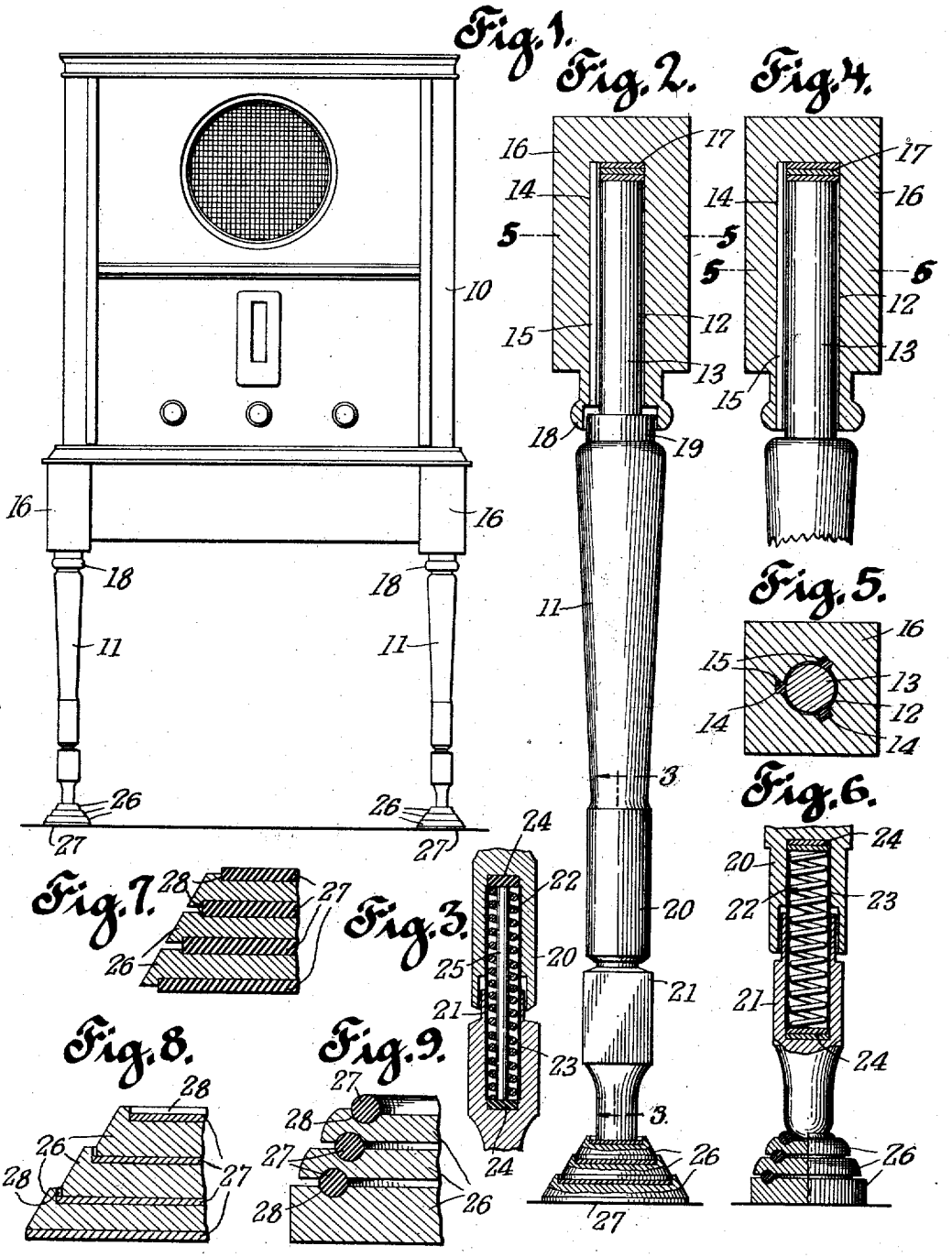
INVENTOR
Harry Phillips
BY Philip S. McJean
ATTORNEY Reissued Nov. 8, 1932

Re. 18,647

UNITED STATES PATENT OFFICE

HARRY PHILLIPS, OF GREENWICH, CONNECTICUT

LEVELING CUSHION FOR RADIO CABINETS

Original No. 1,798,272, dated March 31, 1931, Serial No. 380,125, filed July 22, 1929. Application for reissue filed June 6, 1932. Serial No. 615,739.

This invention relates to radio receiving sets and has for its objects to insulate the cabinet structure containing the radio apparatus against vibration and to accomplish this with a simple practical commercial form of construction, readily applicable to existing radio apparatus and further of such a form as not to mar the generally artistic appearance of the modern radio receiving cabinet.

In the drawing accompanying and forming part of the specification, several different embodiments of the invention are illustrated, but it is to be understood that the structure may be further modified without departure from the true spirit and broad scope of the invention.

Fig. 1 in the drawing is a front elevation of a radio cabinet having the present improvements incorporated therein; Fig. 2 is an enlarged front elevation and part broken sectional view of the cushioned leg construction of the cabinet; Fig. 3 is a detail sectional view as on the plane of line 3—3 of Fig. 2; Fig. 4 is a broken sectional detail of a slight modification in the structure of the upper leg cushion; Fig. 5 is a cross-sectional detail as on lines 5—5 of Figs. 2 and 4; Fig. 6 is a broken sectional detail of another form of the lower leg cushion; Figs. 7 and 8 are broken sectional details of base cushions similar to those shown in Figs. 1 and 2; Fig. 9 is a similar enlarged view of the form of base cushion shown in Fig. 6.

The cabinet containing the radio apparatus is indicated generally at 10 and it should be understood that the same may be of any usual or special construction and of the "console" type shown, the table type of cabinet, or any other style.

Interposed between the cabinet and its support, whether the latter be a floor, table or stand for instance, are cushioned feet which absorb and prevent transmission of vibrations to the cabinet proper.

In the illustration, the cushioned supports are in the form of legs 11 having cushioned sockets in the cabinet base, cushioned intermediate portions and base cushions at the floor.

The cushion sockets for the legs are shown in Figs. 2, 4 and 5 as over-size seats 12 for the cylindrical upper ends 13 of the legs or corner posts, said seats having grooves 14 therein receiving longitudinal strips 15 of rubber or other non-microphonic transmitting, cushioning material, which project from the grooves into yielding engagement with the cylindrical portion of the post. As shown particularly in Fig. 5, these rubber strips may be widened at their inner portions, somewhat in T-form to grip the post and positively prevent contact between the post and the socket formed in the corner structure 16 of the cabinet. A pad or pads 17 of rubber or other suitable vibration absorbing material may be placed in the socket to take the end thrust of the post. This construction enables the post to vibrate in the socket in various directions without imparting such vibrations to the cabinet.

If it is desired to shield or hide the telescopic mounting of the post, a construction like that shown in Figs. 1 and 2 may be adopted where an ornamental flange 18 on the cabinet comes down over a shouldered portion 19 on the post out of contact, so that there can be no transmission of vibration from one solid portion to another.

The intermediate portion of the leg or post is shown cushioned in Figs. 3 and 6 by making the post with relatively telescopic sections 20, 21, free of contact with each other and hollowed to contain a cushioning spring 22, which latter is encased by a flexible sleeve 23 of rubber or the like to keep the leg sections aligned and out of mechanical contact. Pads of cushion material 24 take the end thrust of the sustaining spring, and if desired, a rod 25 may be placed within the spring to aid in aligning the leg sections.

Additional cushioning effect is obtained in the illustration by employing a base cushion for each leg made up of discs 26 of suitable sustaining material, such as wood, hard rubber, bakelite or the like, superposed one on the other with interposed pads or rings 27 of rubber, felt or other non-microphonic transmitting, cushioning material, it being noted in this instance also that the solid portions 26 are maintained by the cushioning material out of contact, so that there can be no mechanical transfer of vibration from one part to another. This spacing of the members, so as not to contact, is effected by arranging the pads or cushions 27 in positioning seats 28 in the solid members. In Figs. 7 and 9, companion seats are formed in the opposing faces of the discs to fit the cushions which thereupon position the members laterally one with respect to the other. In Fig. 8, the discs are made one sufficiently smaller than the other to avoid contact, and if desired, the pads 27 may be secured by adhesive or the like to the adjoining discs, so as to position the latter against possibility of contact. One or a number of the discs may be employed and the lowermost disc may have one of the cushions 27 on the underside of the same for immediate contact with the floor as in Figs. 7 and 8.

In some localities, it is desirable to cushion the cabinet supports at the top, the bottom and intermediate, as illustrated, but in quieter locations where there are less vibrations, it may be sufficient to employ only one or two of the vibration insulators. In each form of insulator, a non-microphonic transmitting, support is provided, which prevents transmission of vibrations and holds the relatively movable parts separated against mechanical contact. The rubber pads also have an electrical insulating effect, which is of importance where the supports for the cabinet are of a metallic nature.

The invention is of simple construction, durable to last the life of the cabinet and can be inexpensively made and applied to radio cabinets, without detracting in any way from the general appearance of the cabinet.

The base or floor cushions when made up of superimposed discs of successively smaller size have an ornamental pyramidal appearance and may be of square, angular, circular or other outline to provide different ornamental effects.

What is claimed is:

1. In combination with a radio cabinet, supports therefor, comprising superposed discs pyramided one on top of the other and of successively smaller sizes with pads of non-microphonic transmitting, cushioning material between adjacent discs, said pads being interlocked in opposing faces of adjoining discs to stabilize the multiple cushioned structure against lateral displacement.

2. As a new article of manufacture, a support for radio cabinets comprising discs of relatively hard material, said discs being of different sizes and having cavities in opposite faces of the same and cushions of softer material proportioned to fit in said cavities and to hold the discs separated when pyramided one on top of the other.

3. As a new article of manufacture, a radio cabinet supporting disc of relatively hard material having cavities in opposite faces of the same and cushions of softer material fitting in said cavities and projecting beyond the surface of the disc.

4. As a new article of manufacture, a support for radio cabinets comprising superposed discs pyramided one on top of the other and of successively smaller sizes, with annuli of non-microphonic transmitting, cushioning material of successively smaller sizes between adjacent discs and all secured together in assembled pyramidal relation by adhesive or the like.

5. As a new article of manufacture, a support for radio cabinets comprising discs of relatively hard material and cushioning pads of softer material between said discs, said discs and pads being of successively smaller sizes toward the top of the support to constitute a pyramid having a wide base for engagement with a floor or other support and a smaller top for engagement with the leg of a radio cabinet, said cushioning pads having the vibration cushioning characteristics of annuli of successively smaller sizes toward the top of the support to effect graduated absorption of vibration and adhesive means securing said discs and pads of successively smaller sizes assembled in the pyramidal relation described.

In testimony whereof, I affix my signature.

HARRY PHILLIPS.